United States Patent [19]
Slat et al.

[11] Patent Number: 5,443,766
[45] Date of Patent: Aug. 22, 1995

[54] METHOD OF MAKING MULTI-LAYER PREFORM USED FOR PLASTIC BLOW MOLDING

[75] Inventors: William A. Slat, Brooklyn, Mich.; Richard C. Darr, Seville, Ohio

[73] Assignee: Plastipak Packaging, Inc., Plymouth, Mich.

[21] Appl. No.: 120,038

[22] Filed: Sep. 10, 1993

[51] Int. Cl.⁶ .................. B29C 45/14; B29C 49/20; B29C 49/06
[52] U.S. Cl. .................. 264/37; 264/255; 264/259; 264/279; 264/513
[58] Field of Search .............. 264/511, 513, 279, 259, 264/255, 37; 428/36.91, 542.8, 903.3

[56] References Cited

U.S. PATENT DOCUMENTS

| | | |
|---|---|---|
| 3,436,376 | 4/1969 | Duling . |
| 3,546,320 | 12/1970 | Duling et al. . |
| 3,719,735 | 3/1973 | Valyi . |
| 3,737,259 | 6/1973 | Valyi . |
| 3,787,157 | 1/1974 | Valyi . |
| 3,803,282 | 4/1974 | Hamana et al. . |
| 3,813,198 | 5/1974 | Valyi . |
| 3,869,056 | 3/1975 | Valyi . |
| 3,878,282 | 4/1975 | Bonis et al. . |
| 3,939,239 | 2/1976 | Valyi .................. 264/513 |
| 3,951,905 | 4/1976 | Sano et al. . |
| 3,954,923 | 5/1976 | Valyi .................. 264/513 |
| 3,955,697 | 3/1976 | Valyi . |
| 3,973,754 | 8/1976 | Chadwick, Jr. . |
| 3,984,379 | 10/1976 | Oka et al. . |
| 3,994,649 | 11/1976 | Valyi . |
| 4,000,239 | 12/1976 | Hamana et al. . |
| 4,013,748 | 3/1977 | Valyi . |
| 4,026,973 | 5/1977 | Shima et al. . |
| 4,034,054 | 7/1977 | Sauer . |
| 4,040,233 | 8/1977 | Valyi . |
| 4,047,874 | 9/1977 | Valyi . |
| 4,060,516 | 11/1977 | Kuratsuji et al. . |
| 4,067,852 | 1/1978 | Calundann . |
| 4,067,855 | 1/1978 | Miwa et al. . |
| 4,067,944 | 1/1978 | Valyi .................. 264/513 |
| 4,079,851 | 3/1978 | Valyi . |
| 4,083,829 | 4/1978 | Calundann et al. . |
| 4,085,177 | 4/1978 | Sauer . |
| 4,092,391 | 5/1978 | Valyi . |
| 4,107,362 | 8/1978 | Valyi . |
| 4,109,813 | 8/1978 | Valyi . |
| 4,130,387 | 12/1978 | Sauer . |
| 4,130,545 | 12/1978 | Calundann . |

(List continued on next page.)

FOREIGN PATENT DOCUMENTS

| | | | |
|---|---|---|---|
| 63-107523 | 5/1988 | Japan | .................. 264/513 |
| 8501472 | 4/1985 | WIPO | .................. 264/513 |

OTHER PUBLICATIONS

Derwent World Patent Index Search Polyethylene Naphthalate (PEN).

Amoco-Bulletin FA-4d.

*Primary Examiner*—Catherine Timm
*Attorney, Agent, or Firm*—Brooks & Kushman

[57] ABSTRACT

A multi-layer preform (26a, 26b, 26c) used for plastic blow molding and a method for making the preform provides an inner layer (28) of polyethylene naphthalate and an injection molded outer layer (30) of polyethylene terephthalate which has reduced transmission of gas upon blow molding as a container due to the gas barrier provided by the inner layer of polyethylene naphthalate. The inner layer (28) of polyethylene naphthalate by itself or along with a further inner layer (32) of virgin polyethylene terephthalate is thermoformed prior to the injection molding of the outer layer (30) of polyethylene terephthalate. A minimal amount of the polyethylene naphthalate which is relatively expensive can be utilized due to the thermoforming and injection molding as disclosed.

14 Claims, 3 Drawing Sheets

U.S. PATENT DOCUMENTS

| | | | |
|---|---|---|---|
| 4,149,645 | 4/1979 | Valyi. | |
| 4,162,883 | 7/1979 | Sauer. | |
| 4,224,275 | 9/1980 | Sauer. | |
| 4,289,817 | 9/1981 | Valyi. | |
| 4,307,137 | 12/1981 | Ota et al. . | |
| 4,327,052 | 4/1982 | Sauer. | |
| 4,355,132 | 10/1982 | East et al. . | |
| 4,375,530 | 3/1983 | Hay et al. . | |
| 4,391,861 | 7/1983 | Nilsson . | |
| 4,501,781 | 2/1985 | Kushida et al. . | |
| 4,513,037 | 4/1985 | Collins . | |
| 4,534,930 | 8/1985 | Nohara . | |
| 4,560,741 | 12/1985 | Davis et al. | 264/513 |
| 4,646,925 | 3/1987 | Nohara . | |
| 4,647,483 | 3/1987 | Tse et al. . | |
| 4,665,135 | 5/1987 | Tse et al. . | |
| 4,683,170 | 7/1987 | Tse et al. . | |
| 4,741,936 | 5/1988 | Nohara et al. . | |
| 4,781,954 | 11/1988 | Krishnakumar et al. . | |
| 4,797,244 | 1/1989 | Sauer . | |
| 4,798,883 | 1/1989 | Tung et al. . | |
| 4,808,482 | 2/1989 | Benge et al. | 428/411.1 |
| 4,876,378 | 10/1989 | Van Sickle . | |
| 4,942,008 | 7/1990 | Cahill | 264/150 |
| 4,980,211 | 12/1990 | Kushida et al. . | |
| 4,996,269 | 2/1991 | Richeson et al. . | |
| 5,006,603 | 4/1991 | Takaki et al. . | |
| 5,039,780 | 8/1991 | Hashimoto et al. . | |
| 5,040,963 | 8/1991 | Beck et al. | 425/130 |
| 5,102,705 | 4/1992 | Yammoto et al. . | |
| 5,115,047 | 5/1992 | Hashimoto et al. . | |
| 5,205,430 | 4/1993 | Valyi | 220/278 |
| 5,303,834 | 4/1994 | Krishnakumar et al. . | |

METHOD OF MAKING MULTI-LAYER PREFORM USED FOR PLASTIC BLOW MOLDING

TECHNICAL FIELD

This invention relates to a multi-layer preform used for plastic blow molding and to a method for making the preform.

BACKGROUND ART

Plastic blow molding is conventionally performed by providing a hot plastic parison either from extruded plastic or as a preform which is usually injection molded from plastic. Usually, such preforms are composed of a single type of plastic that is injected into a mold through a single port. However, there have also been attempts to provide coinjection of more than one plastic into a mold so as to provide different layers of plastic.

U.S. Pat. No. 3,878,282 to Bonis et al. discloses a process for molding multi-layer articles that are specifically disposed as a preform-type parison with different layers. The process involved is performed by injection molding the different layers within different molds while mounted on the same inner mandrel during the injection of each layer.

U.S. Pat. No. 4,307,137 to Ota et al. discloses a method for forming an optical design pattern in polyethylene terephthalate articles which are specifically disclosed as a blow molding preform having inner and outer members with the inner member having an open end defining a thread closure and with the outer member having a junction with the inner member toward a closed end of the preform from the thread closure.

U.S. Pat. No. 4,391,861 to Nilsson discloses a preform of a thermoplastic and has a two-part interfitted construction and at least one intermediate layer that functions as a gas barrier, and also discloses that the outer part may be previously used and reprocessed material.

U.S. Pat. No. 4,646,925 to Nohara discloses a multi-layer preform for draw-blow forming a bottle which has inner and outer layers with a junction that is located toward a closed end of the preform from a closure thread at an open end of the preform. The preform also includes a gas barrier intermediate the inner and outer layers.

U.S. Pat. No. 5,102,705 discloses a bottle made of polyethylene naphthalate resin produced by highly stretching a preform in a manner that is disclosed as limiting gas permeability and x-ray transmission.

There have been attempts in the past, such as disclosed by the aforementioned Nilsson patent, to utilize post consumer recycled plastic for plastic blow molding since such reuse reduces the need for additional land fills as well as conserving on natural resources in the manufacturing of new articles. Such prior attempts have utilized injection molding or extrusion which necessarily limits the amount of post consumer recycled plastic which can be utilized since it is difficult to injection mold or extrude relatively thin wall preforms used for plastic blow molding. The maximum amount of post consumer recycled plastic which has been used to date is about 50% by weight of the total weight of the preform.

Blow molding has also previously been performed utilizing a preform that is initially thermoformed from film, i.e. sheet plastic, that provides a moisture and/or oxygen barrier prior to injection molding of an outer protective layer. After the thermoforming, the formed film is trimmed and the outer layer is then injection molded around the thermoformed plastic prior to the finished preform being blow molded to provide the resultant container.

The dominant gas barrier commercially utilized at the present time to prevent gas transmission through blow molded containers is ethyl vinyl alcohol which may be dipped, sprayed or brushed as well as coinjected with plastic resin. One disadvantage of ethyl vinyl alcohol is that it must be fully enveloped by the plastic of the preform or it will tend to draw moisture from the atmosphere and thereby loses its ability to function in preventing gas transmission through the container.

DISCLOSURE OF INVENTION

One object of the present invention is to provide an improved multi-layer preform used for plastic blow molding.

In carrying out the above object, the multilayer preform used for plastic blow molding has an inner layer of polyethylene naphthalate for providing a gas barrier. The preform also has an injection molded outer layer of polyethylene terephthalate which, upon blowing of the preform into a container, has reduced transmission of gas due to the gas barrier provided by the inner layer of polyethylene naphthalate.

It is possible for the multi-layer preform used for plastic blow molding to be constructed with the inner layer consisting essentially only of the polyethylene naphthalate or as a mixture of the polyethylene naphthalate and a further resin. The further resins which may be utilized can be polyolefins, polyamides, polycarbonates, polyesteramides, polyesters and combinations of these resins. More specifically, the further resin may be polyethylene terephthalate from which the outer layer is also injection molded. Use of such further resins while somewhat decreasing the gas barrier properties of the inner layer reduces the amount of polyethylene naphthalate utilized which is substantially more expensive than the polyethylene terephthalate and other resins.

In one embodiment, the preform is constructed with the outer layer of polyethylene terephthalate injection molded from virgin polyethylene terephthalate. In this embodiment, the inner layer of polyethylene naphthalate and the outer layer of virgin polyethylene terephthalate have a direct interface with each other.

In other embodiments of the preform, the outer layer is injection molded from post consumer recycled polyethylene terephthalate. Such further embodiments are also disclosed as having a further inner layer of virgin polyethylene terephthalate that cooperates with the inner layer of polyethylene naphthalate in separating the outer layer of post consumer recycled polyethylene terephthalate from the contents of the container that is blow molded from the preform. In one such embodiment, the further inner layer of virgin polyethylene terephthalate is located between the inner layer of polyethylene naphthalate and the outer layer of post consumer recycled polyethylene terephthalate. In another such embodiment, the inner layer of polyethylene naphthalate is located between the inner layer of virgin polyethylene terephthalate and the outer layer of post consumer polyethylene terephthalate.

Another object of the invention is to provide an improved method for making a multi-layer preform used for plastic blow molding.

In carrying out the immediately preceding above object, the improved method for making a multilayer preform used for plastic blow molding is performed by thermoforming a sheet of polyethylene naphthalate to provide an inner layer that functions as a gas barrier. Injection molding of an outer layer of polyethylene terephthalate is performed around the inner layer of polyethylene naphthalate which limits the transmission of gas through the outer layer of polyethylene terephthalate upon blow molding of the preform into a container.

The method is performed utilizing a sheet of virgin polyethylene terephthalate that is thermoformed to provide a further inner layer that has a direct interface with the inner layer of polyethylene naphthalate, and the injection molding is subsequently performed about the inner layers utilizing post consumer recycled polyethylene terephthalate. The sheets of polyethylene naphthalate and virgin polyethylene terephthalate are preferably thermoformed simultaneously with each other. The thermoformed sheets of polyethylene naphthalate and virgin polyethylene terephthalate are most preferably transferred together with each other to the injection mold for the injection molding of the post consumer recycled polyethylene terephthalate. In one practice, the thermoforming is performed to provide the inner layer of virgin polyethylene terephthalate between the inner layer of polyethylene naphthalate and the outer layer of post consumer recycled polyethylene terephthalate. In another practice, the thermoforming is performed to provide the inner layer of polyethylene naphthalate between the inner layer of virgin polyethylene terephthalate and the outer layer of post consumer recycled polyethylene terephthalate.

As disclosed, the sheet of polyethylene naphthalate and the sheet of virgin polyethylene terephthalate are moved into engagement with each other for the thermoforming. The thermoformed inner layers of polyethylene naphthalate and virgin polyethylene terephthalate are each separated from the associated sheet, preferably by a trimming operation. Furthermore, the sheets of polyethylene naphthalate and virgin polyethylene terephthalate are disengaged from each other after the separation therefrom of the thermoformed inner layers.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
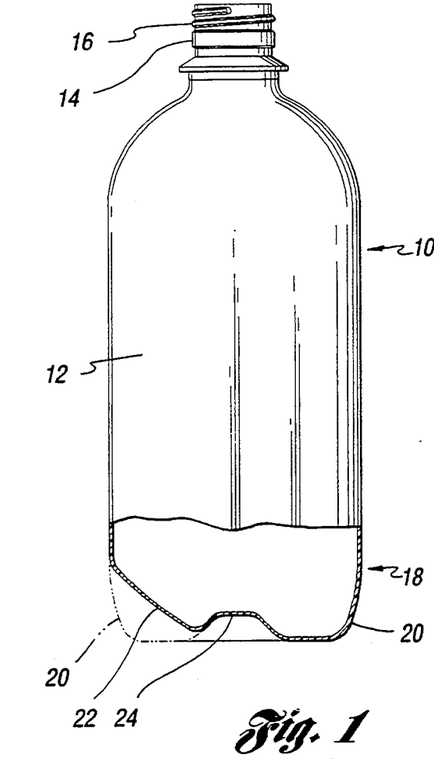
FIG. 1 is a partially broken away side elevational view of a plastic blow molded container formed from a preform according to the present invention.

With reference to FIG. 1 of the drawings, a plastic blow molded container generally indicated by 10 is blow molded from a multi-layer preform constructed according to the present invention as is hereinafter more fully described. The plastic blow molded container 10 includes a cylindrical body portion 12 that extends vertically. An upper end closure 14 of the container is unitary with the upper extremity of the cylindrical body portion 12 and includes a dispensing spout which is illustrated as having a thread 16 for securing an unshown cap-type closure. The container also includes a freestanding base structure 18 unitary with the cylindrical body portion 12 to close its lower extremity. The freestanding base structure 18 further includes a plurality of downwardly projecting hollow legs 20 (only one shown) spaced circumferentially from each other with respect to the body portion. The freestanding base structure 18 also includes a plurality of curved ribs 22 (only one shown) spaced circumferentially from each other between the downwardly projecting legs 20. The freestanding base structure 18 of the container also includes a central hub 24 with the legs 20 and curved ribs 22 extending radially therefrom in a circumferentially alternating relationship to each other. Of course, it should be understood that while the container illustrated is of the freestanding type with legs and curved ribs, other freestanding containers without legs and curved ribs as well as containers that have a lower base cup for support can also be blow molded from preforms according to the present invention as described below.

Figures 2, 2A:
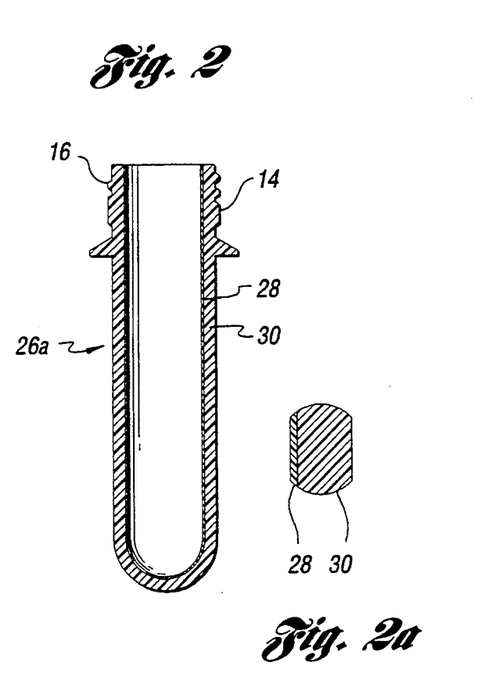
FIG. 2 is an elevational sectional view of one embodiment of a preform that is constructed in accordance with the present invention to include an inner layer of polyethylene naphthalate and an outer layer of virgin polyethylene terephthalate.
FIG. 2a is a partial sectional view of the preform shown in FIG. 2 but at an enlarged scale.
Figures 3, 3A:
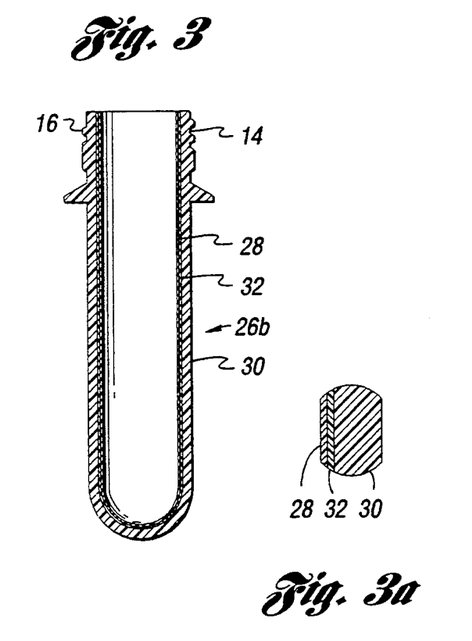
FIG. 3 is an elevational view taken in section of another embodiment of the preform which includes an inner layer of polyethylene naphthalate, a further inner layer of virgin polyethylene terephthalate and an injection molded outer layer of post consumer recycled polyethylene terephthalate with the inner layer of virgin polyethylene terephthalate located between the inner layer of polyethylene naphthalate and the injection molded outer layer of post consumer recycled polyethylene terephthalate.
FIG. 3a is a partial sectional view of the preform shown in FIG. 3 but at an enlarged scale.
Figures 4, 4A:
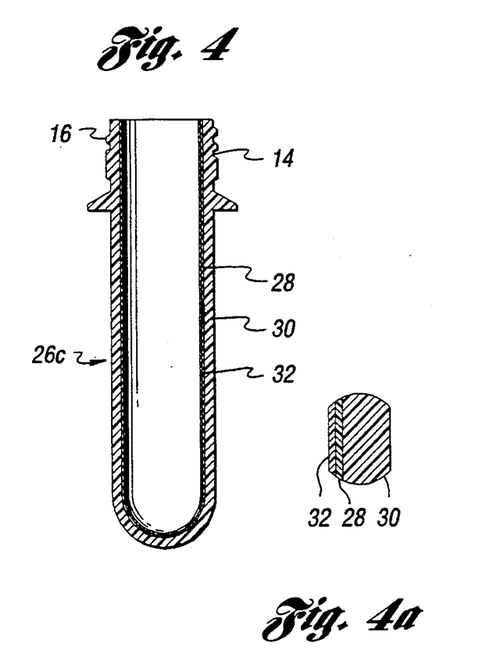
FIG. 4 is an elevational sectional view of another embodiment of the preform which includes an inner layer of polyethylene naphthalate, a further inner layer of virgin polyethylene terephthalate and an injection molded outer layer of post consumer recycled polyethylene terephthalate with the inner layer of polyethylene naphthalate located between the inner layer of virgin polyethylene terephthalate and the injection molded outer layer of post consumer recycled polyethylene terephthalate.
FIG. 4a is a partial sectional view of the preform shown in FIG. 4 but at an enlarged scale.

With reference to FIGS. 2, 3 and 4, three preferred embodiments of a multi-layer preform 26a, 26b and 26c used for plastic blow molding are each constructed with a vertically extending tubular shape having a lower closed end and has an upper open end from which the container 10 shown in FIG. 1 is blow molded. This blow molding is preferably performed by stretch blow molding to provide biaxial orientation of the container wall so as to have enhanced strength. While the multi-layer preforms 26a, 26b and 26c have different constructions as is hereinafter more fully described, each preform has an inner layer 28 of polyethylene naphthalate for providing a gas barrier and also has an injection molded outer layer 30 of polyethylene terephthalate which, upon blowing of the preform into the container as described above, has reduced transmission of gas due to the gas barrier provided by the inner layer of polyethylene naphthalate. As hereinafter more fully described, the inner layer 28 of polyethylene naphthalate is thermoformed which permits a relatively thin wall to be provided as compared to injection molding.

Polyethylene naphthalate has a greater ability to prevent gas transmission than does polyethylene terephthalate, especially with carbon dioxide and oxygen wherein only about ⅛ or so and 1/5 or so, respectively, of the gas will permeate through polyethylene naphthalate as compared to polyethylene terephthalate. It is also possible to provide stretch blow molding of polyethylene naphthalate so it can be biaxially oriented with the polyethylene terephthalate in the multi-layer preform constructions disclosed. Furthermore, it should also be appreciated that polyethylene naphthalate can be hot filled and thus is useful for food processing or other processing whose contents are heated upon filling.

Each embodiment of the preform 26a, 26b and 26c may have the inner layer 28 of polyethylene naphthalate consisting essentially only of the polyethylene naphthalate or as a mixture of polyethylene naphthalate and a further resin. Possibilities of the further resin utilized are polyolefins, polyamides, polycarbonates, polyesteramides, polyesters and combinations of these resins. More specifically, the use of polyethylene terephthalate which is a polyester while reducing the gas barrier properties somewhat still allows the polyethylene naphthalate to function as a gas barrier while decreasing the extent of the polyethylene naphthalate required so as to permit recycling of the used container and limiting the extent of non-polyethylene terephthalate as part of the container. Such limitation of the non-polyethylene terephthalate percentage of the container allows it to fall into a more select classification as part of the recycling. More specifically, for a certain classification, it is necessary for the non-polyethylene terephthalate to be less than about 1 ½% by weight of the total container weight.

With specific reference to FIG. 2, the multilayer preform 26a has the outer layer 30 of polyethylene terephthalate injection molded from virgin polyethylene terephthalate. Furthermore, the inner layer 28 of polyethylene naphthalate of this embodiment of the preform and the outer layer 30 of virgin polyethylene terephthalate have a direct interface with each other. With this construction, the extent of polyethylene naphthalate utilized need only be sufficient to provide the required gas barrier properties for the resultant container. As such, the amount of polyethylene naphthalate can be reduced as permitted to meet recycling classifications. Furthermore, since the end closure 14 of the resultant container is thicker than the rest of the container and the outer layer 30 is virgin polyethylene terephthalate, the inner layer 28 of polyethylene naphthalate can terminate below the upper extremity of the outer layer 30 of polyethylene terephthalate without greatly reducing the gas barrier capability of the container and while still allowing the container to be used for food or beverages.

With reference to FIGS. 3 and 4, each of the embodiments of the preform 26b and 26c has the outer layer 30 thereof injection molded from post consumer recycled polyethylene terephthalate. Each of the embodiments of the preform 26b and 26c also includes a further inner layer 32 of virgin polyethylene terephthalate that cooperates with the inner layer 28 of polyethylene naphthalate in separating the outer layer 30 of post consumer recycled polyethylene terephthalate from the contents of the container that is blow molded from the preform. With the FIG. 3 embodiment of the preform 26b, the further inner layer 32 of virgin polyethylene terephthalate is located between the inner layer 28 of polyethylene naphthalate and the outer layer 30 of post consumer recycled polyethylene terephthalate. With the FIG. 4 embodiment of the preform 26c, the inner layer 28 of polyethylene naphthalate is located between the inner layer 32 of virgin polyethylene terephthalate and the outer layer 30 of post consumer recycled polyethylene terephthalate. Use of the further inner layer 32 of virgin polyethylene terephthalate in cooperation with the inner layer 28 of polyethylene naphthalate in both the FIG. 2 and the FIG. 3 embodiments of the preform allows minimal use of the polyethylene naphthalate to provide the required gas barrier needed while still providing wall thickness separation from the outer layer 30 of post consumer recycled polyethylene terephthalate in order to meet standards set by regulatory agencies in connection with containers made from recycled resin.

Figure 5:
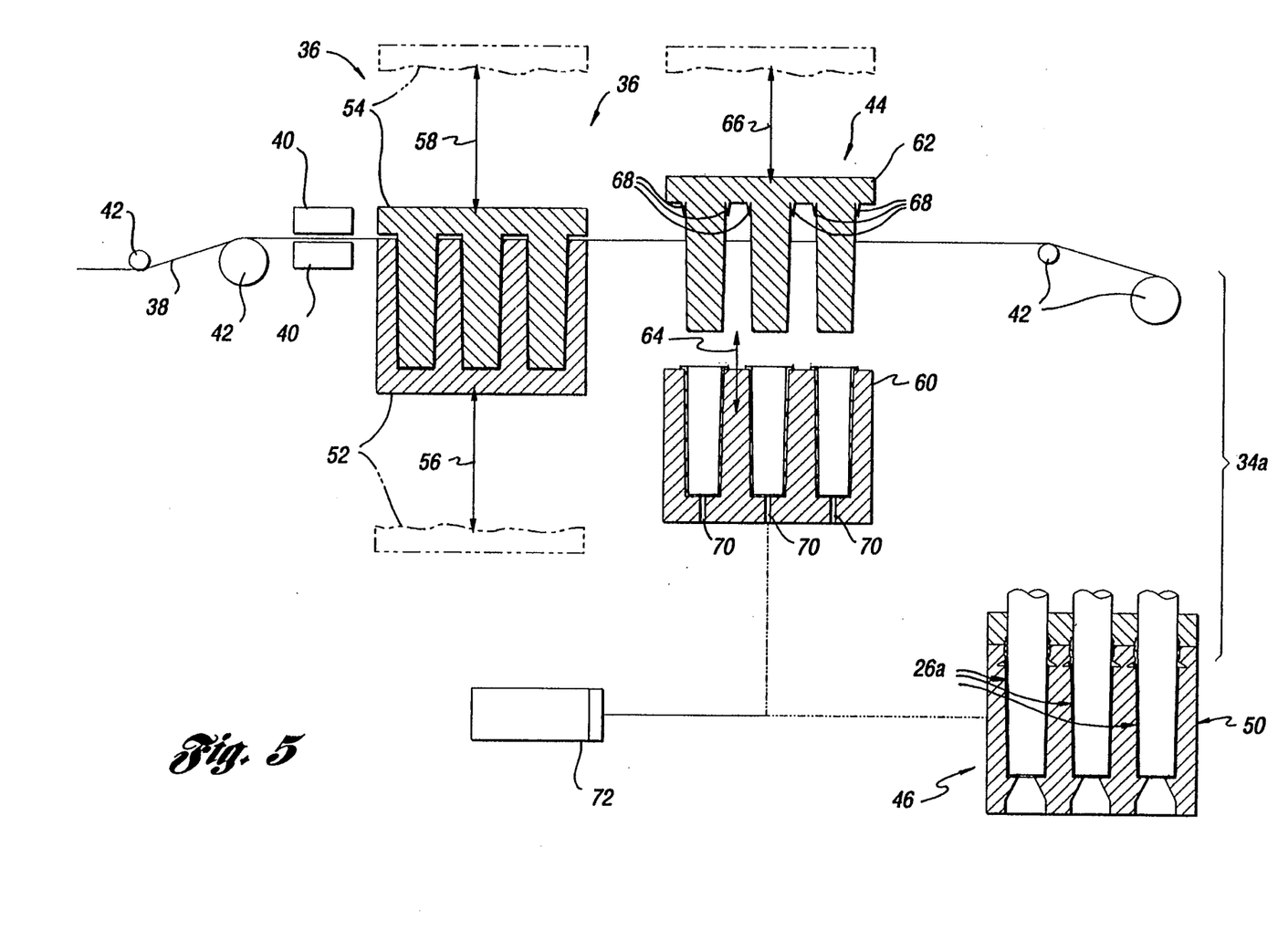
FIG. 5 is a view that illustrates the method for making the FIG. 2 embodiment of the preform by thermoforming and subsequent injection molding.
Figures 6, 7, 8:
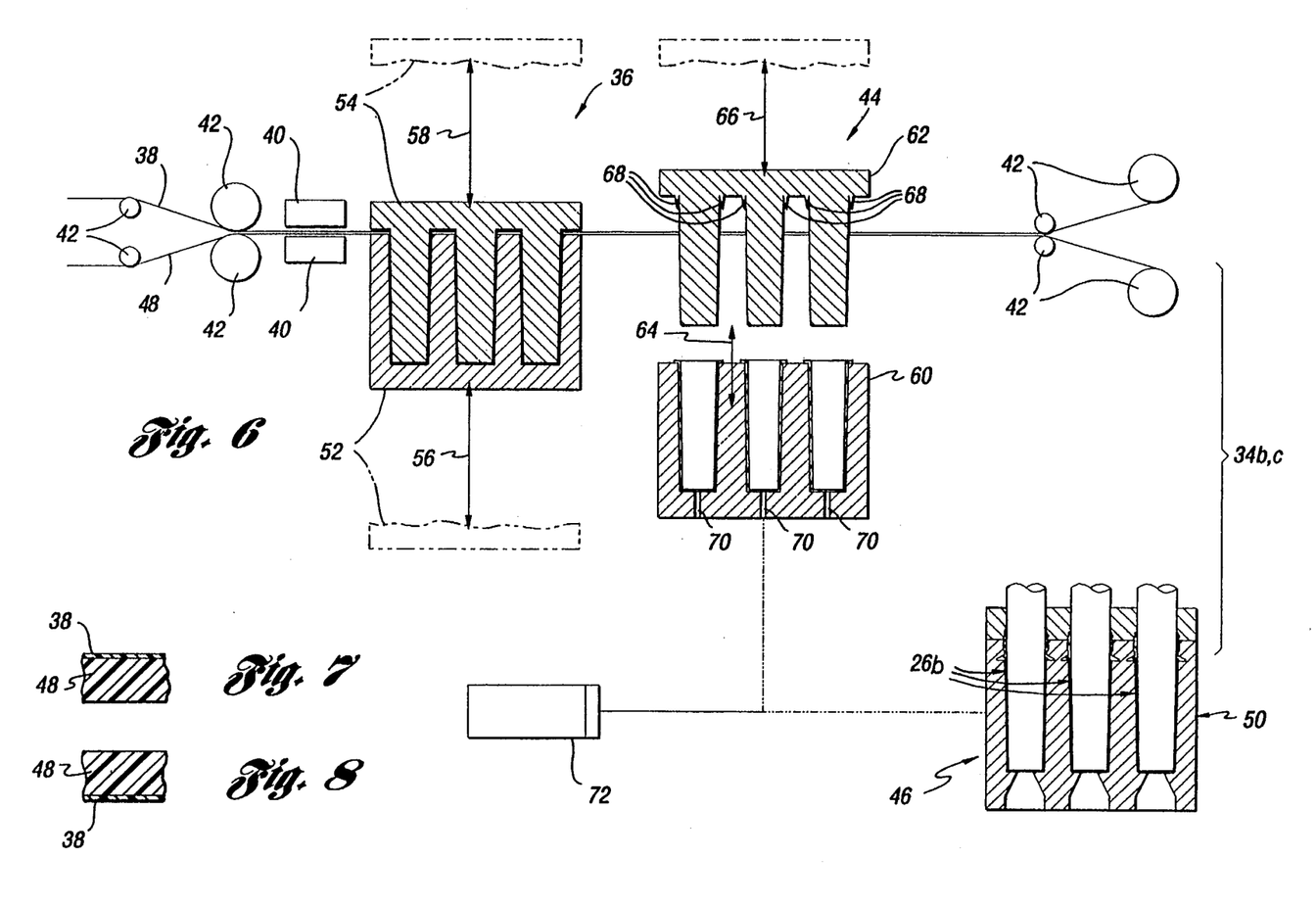
FIG. 6 is a view that illustrates the method for making the preform embodiments of FIGS. 3 and 4 by thermoforming and subsequent injection molding.
FIG. 7 illustrates the manner in which the method is performed in FIG. 6 to make the FIG. 3 embodiment of the preform wherein the inner layer of polyethylene naphthalate is located inside of the inner layer of virgin polyethylene terephthalate.
FIG. 8 is a view that illustrates the manner in which the method is performed in FIG. 6 to make the FIG. 4 embodiment of the preform wherein the inner layer of virgin polyethylene terephthalate is located inside of the inner layer of polyethylene naphthalate.

With reference to FIGS. 5 and 6, apparatus 34a and 34b,c respectively operate to perform the method for making a multi-layer preform used for plastic blow molding as illustrated by the embodiment 26a of FIG. 2 and the embodiments 26b and 26c of FIGS. 3 and 4. More specifically, each of the embodiments of the apparatus 34a and 34b,c includes a thermoforming station 36 for thermoforming a sheet 38 of polyethylene naphthalate to provide the inner layer 28 of polyethylene naphthalate with the elongated tubular construction having a closed end and an open end as previously described in connection with FIGS. 2–4. Suitable heaters 40 heat the sheet 28 of polyethylene naphthalate which is essentially a film of the required thickness prior to the thermoforming at the thermoforming station 36. Rolls 42 move the sheet 38 of polyethylene naphthalate along the apparatus from the left toward the right as illustrated. After the thermoforming as is hereinafter more fully described, the sheet 38 of polyethylene naphthalate is moved to a trimming station 44 where the upper open end of the inner layer 28 of polyethylene naphthalate is cut from the rest of the sheet for subsequent transfer as is hereinafter more fully described to an injection molding machine 46. Thereafter, the injection molding of the outer layer of polyethylene terephthalate is performed around the inner layer of polyethylene naphthalate which, as previously described, limits the transmission of gas through the outer layer of polyethylene terephthalate upon blowing of the resultant preform into a container.

Use of the apparatus 34a as illustrated in FIG. 5 is performed with the sheet 38 of the polyethylene naphthalate thermoformed by itself at the thermoforming station 36 prior to being trimmed at the trimming station 44 and transferred to the injection molding machine 46 where the outer layer 30 of polyethylene terephthalate is injection molded. More specifically, in order to maintain as little polyethylene naphthalate as possible as part of the preform, it is preferable for the apparatus 34a to perform the method by injection molding the outer layer 30 from virgin polyethylene terephthalate.

Apparatus 34b,c illustrated in FIG. 6 is utilized to make the embodiment of the preform 26b shown in FIG. 3 or the embodiment 26c shown in FIG. 4 by thermoforming a further sheet 48 of virgin polyethylene terephthalate to provide the further inner layer 32 that has a direct interface with the inner layer 28 of polyethylene naphthalate such that the subsequent injection molding is performed about the inner layers and can utilize post consumer recycled polyethylene terephthalate while still having the required thickness between the container contents and the recycled plastic. More specifically, the sheet 38 of polyethylene naphthalate and the sheet 48 of virgin polyethylene terephthalate are thermoformed at the thermoforming station 36 simultaneously with each other. Subsequently, the thermoformed sheets 38 and 48 of polyethylene naphthalate and virgin polyethylene terephthalate are transferred together with each other to the mold 50 of the injection molding machine 46 for the injection molding of the post consumer recycled polyethylene terephthalate that provides the outer layer 30.

Apparatus 34b,c shown in FIG. 6 is utilized as illustrated with the sheet 38 of polyethylene naphthalate positioned above the sheet 48 of virgin polyethylene terephthalate as also shown in FIG. 7 so that the thermoforming is performed to provide the inner layer 32 of virgin polyethylene terephthalate between the inner layer 28 of polyethylene naphthalate and the outer layer 30 of post consumer recycled polyethylene terephthalate in accordance with the embodiment of the preform 26b shown in FIG. 3.

Apparatus 34b,c shown in FIG. 6 is utilized with the respective positions of the sheet 38 of polyethylene naphthalate and the sheet 48 of virgin polyethylene terephthalate reversed as illustrated in FIG. 8 such that the thermoforming is performed to provide the inner layer 28 of polyethylene naphthalate between the inner layer 32 of virgin polyethylene terephthalate and the outer layer 30 of post consumer recycled polyethylene terephthalate.

With combined reference to FIGS. 5 and 6, the thermoforming station 36 has lower and upper mold members 52 and 54 which are moved between the open phantom line indicated positions and the closed solid line indicated positions along the directions of arrows 56 and 58 to perform the thermoforming and then release the thermoformed inner layer or layers for the trimming and subsequent injection molding. It should be noted that multiple preform inner layers are simultaneously thermoformed, trimmed and then injection molded for efficiency. More specifically, the thermoforming is most efficiently performed in multiple numbers that facilitate effective transfer to the particular injection molding machine 46 where multiple preforms are injection molded. Each cycle of the thermoforming commences with the lower and upper mold members 52 and 54 in their phantom line indicated positions whereupon movement of these mold members toward each other forms the heated sheet into the inner layer 28 of polyethylene naphthalate by itself as shown in FIG. 5 or along with the further inner layer 32 of virgin polyethylene terephthalate as shown in FIG. 6, preferably with multiple formings taking place upon each stroke as described above.

With further reference to FIGS. 5 and 6, after the thermoforming as previously described, the sheet 38 of polyethylene naphthalate by itself as illustrated in FIG. 5 or along with the sheet 48 of virgin polyethylene terephthalate as illustrated in FIG. 6 is moved by the associated rolls 42 to the trimming station 44 where lower and upper trimming members 60 and 62 are located. These lower and upper trimming members 60 and 62 are moved toward and away from each other as illustrated by arrows 64 and 66 such that sharp cutters 68 thereof separate the upper open end of each inner layer from the rest of the associated sheet and the sheets of polyethylene naphthalate 38 and virgin polyethylene terephthalate 48 are subsequently separated from each other upon passage to the rolls 42. The lower member 60 preferably has vacuum passages 70 through which a vacuum is drawn to hold the trimmed inner layers to this member prior to transfer thereof by a suitable actuator 72 to the injection molding machine 44 where positioning of each inner layer within the mold 50 thereof for the injection molding of the outer layer 30 of polyethylene terephthalate as previously described.

The polyethylene terephthalate multi-layer preforms 26b and 26c respectively, illustrated in FIGS. 3 and 4 have an outer layer 30 of post consumer recycled polyethylene terephthalate which by weight is greater than about 75% of the total weight of the preform, as compared with a maximum of about 50% with conventional preforms. In the preferred construction of the preforms 26b and 26c, the injection molded outer layer 30 of post consumer recycled polyethylene terephthalate by weight is greater than about 85% of the total weight of the preform, is most preferably in the range of about 88-92% of the total weigh of the preform, and optimally is about 90% of the total weight of the preforms. More specifically, the construction of the multi-layer preforms 26b and 26c with the inner layer 28 of polyethylene naphthalate and the inner layer 32 of virgin polyethylene terephthalate both thermoformed allows the greater use of post consumer recycled polyethylene terephthalate for the outer layer 30 than has been possible in the past.

While the best modes for carrying out the invention have been described in detail, those familiar with the art to which this invention relates will recognize various alternative ways of practicing the invention as described by the following claims.

What is claimed is:

1. A method for making a multi-layer preform used for plastic blow molding, the method comprising:
   thermoforming a sheet of polyethylene naphthalate to provide an inner layer that functions as a gas barrier;
   thermoforming a sheet of virgin polyethylene terephthalate to provide a further inner layer that has a direct interface with the inner layer of polyethylene naphthalate; and
   injection molding an outer layer of post consumer recycled polyethylene terephthalate around the inner layer of virgin polyethylene terephthalate and the inner layer of polyethylene naphthalate which limits the transmission of gas through the outer layer of polyethylene terephthalate upon blow molding of the preform into a container.

2. A method for making a multi-layer preform used for plastic blow molding as in claim 1 wherein the sheets of polyethylene naphthalate and virgin polyethylene terephthalate are thermoformed simultaneously with each other.

3. A method for making a multi-layer preform used for plastic blow molding as in claim 2 wherein the thermoformed sheets of polyethylene naphthalate and virgin polyethylene terephthalate are transferred together with each other to the injection mold for the injection molding of the post consumer recycled polyethylene terephthalate.

4. A method for making a multi-layer preform used for plastic blow molding as in claim 3 wherein the thermoforming is performed to provide the inner layer of virgin polyethylene terephthalate between the inner layer of polyethylene naphthalate and the outer layer of post consumer recycled polyethylene terephthalate.

5. A method for making a multi-layer preform used for plastic blow molding as in claim 3 wherein the thermoforming is performed to provide the inner layer of polyethylene naphthalate between the inner layer of virgin polyethylene terephthalate and the outer layer of post consumer recycled polyethylene terephthalate.

6. A method for making a multi-layer preform used for plastic blow molding as in claim 1 wherein the sheet of polyethylene naphthalate and the sheet of virgin polyethylene terephthalate are moved into engagement with each other for the thermoforming.

7. A method for making a multi-layer preform used for plastic blow molding as in claim 6 wherein the thermoformed inner layers of polyethylene naphthalate and virgin polyethylene terephthalate are each separated from the associated sheet.

8. A method for making a multi-layer preform used for plastic blow molding as in claim 7 wherein a trimming operation is performed to separate the thermoformed inner layers of polyethylene naphthalate and virgin polyethylene terephthalate from their associated sheets.

9. A method for making a multi-layer preform used for plastic blow molding as in claim 7 wherein the sheets of polyethylene naphthalate and virgin polyethylene terephthalate are disengaged from each other after the separation therefrom of the thermoformed inner layers.

10. A method for making a multi-layer preform used for plastic blow molding, the method comprising:
thermoforming a sheet of polyethylene naphthalate to provide an inner layer that functions as a gas barrier;
thermoforming a sheet of virgin polyethylene terephthalate to provide a further inner layer;
transferring the inner layers of polyethylene naphthalate and polyethylene terephthalate to an injection mold; and
injection molding within the injection mold an outer layer of post consumer recycled polyethylene terephthalate around the inner layer of virgin polyethylene terephthalate and the inner layer of polyethylene naphthalate which limits the transmission of gas through the outer layer of polyethylene terephthalate upon blow molding of the preform into a container.

11. A method for making a multi-layer preform used for plastic blow molding, the method comprising:
thermoforming a sheet of polyethylene naphthalate, to provide an inner layer that functions as a gas barrier, while simultaneously thermoforming a sheet of virgin polyethylene terephthalate to provide a further inner layer;
transferring the inner layers of polyethylene naphthalate and virgin polyethylene terephthalate to an injection mold; and
injection molding within the injection mold an outer layer of post consumer recycled polyethylene terephthalate around the inner layers of polyethylene naphthalate and virgin polyethylene terephthalate which, upon blow molding of the preform into a container, cooperatively separate the injection molded outer layer of post consumer recycled polyethylene terephthalate from the contents of the container while the inner layer of polyethylene naphthalate limits the transmission of gas through the container.

12. A method for making a multi-layer preform used for plastic blow molding, the method comprising:
thermoforming a sheet of polyethylene naphthalate, to provide an inner layer that functions as a gas barrier, while simultaneously thermoforming a sheet of virgin polyethylene terephthalate to provide a further inner layer with the inner layer of polyethylene naphthalate having a direct interface with and being located within the inner layer of virgin polyethylene terephthalate;
transferring the inner layers of polyethylene naphthalate and virgin polyethylene terephthalate to an injection mold; and
injection molding within the injection mold an outer layer of post consumer recycled polyethylene terephthalate around the inner layers of polyethylene naphthalate and virgin polyethylene terephthalate which, upon blow molding of the preform into a container, cooperatively separate the injection molded outer layer of post consumer recycled polyethylene terephthalate from the contents of the container while the inner layer of polyethylene naphthalate limits the transmission of gas through the container.

13. A method for making a multi-layer preform used for plastic blow molding, the method comprising:
thermoforming a sheet of polyethylene naphthalate, to provide an inner layer that functions as a gas barrier, while simultaneously thermoforming a sheet of virgin polyethylene terephthalate to provide a further inner layer with the inner layer of virgin polyethylene terephthalate having a direct interface with and being located within the inner layer of polyethylene naphthalate;
transferring the inner layers of polyethylene naphthalate and virgin polyethylene terephthalate to an injection mold; and
injection molding within the injection mold an outer layer of post consumer recycled polyethylene terephthalate around the inner layers of polyethylene naphthalate and virgin polyethylene terephthalate which, upon blow molding of the preform into a container, cooperatively separate the injection molded outer layer of post consumer recycled polyethylene terephthalate from the contents of the container while the inner layer of polyethylene naphthalate limits the transmission of gas through the container.

14. A method for making a multi-layer preform used for plastic blow molding, the method comprising:

engaging a sheet of polyethylene naphthalate and a sheet of virgin polyethylene terephthalate with each other;

thermoforming the sheet of polyethylene naphthalate, to provide an inner layer that functions as a gas barrier, while simultaneously thermoforming the sheet of virgin polyethylene terephthalate to provide a further inner layer;

separating the thermoformed inner layers of polyethylene naphthalate and virgin polyethylene terephthalate from their associated sheets;

disengaging the sheets of polyethylene naphthalate and virgin polyethylene terephthalate from each other after the separation therefrom of the thermoformed inner layers;

transferring the thermoformed inner layers of polyethylene naphthalate and virgin polyethylene terephthalate to an injection mold after separation from their associated sheets; and injection molding within the injection mold of an outer layer of post consumer recycled polyethylene terephthalate around the inner layers of polyethylene naphthalate and virgin polyethylene terephthalate which, upon blow molding of the preform into a container, cooperatively separate the injection molded outer layer of post consumer recycled polyethylene terephthalate from the contents of the container while the inner layer of polyethylene naphthalate limits the transmission of gas through the container.

* * * * *